No. 708,392. Patented Sept. 2, 1902.
O. O. OZIAS.
SPRING BALANCE SCALE.
(Application filed July 26, 1897.)
(No Model.) 2 Sheets—Sheet 1.
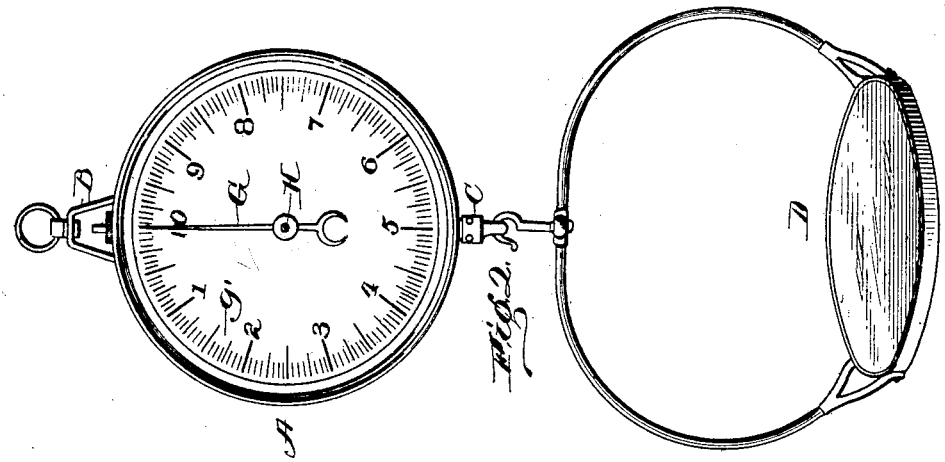
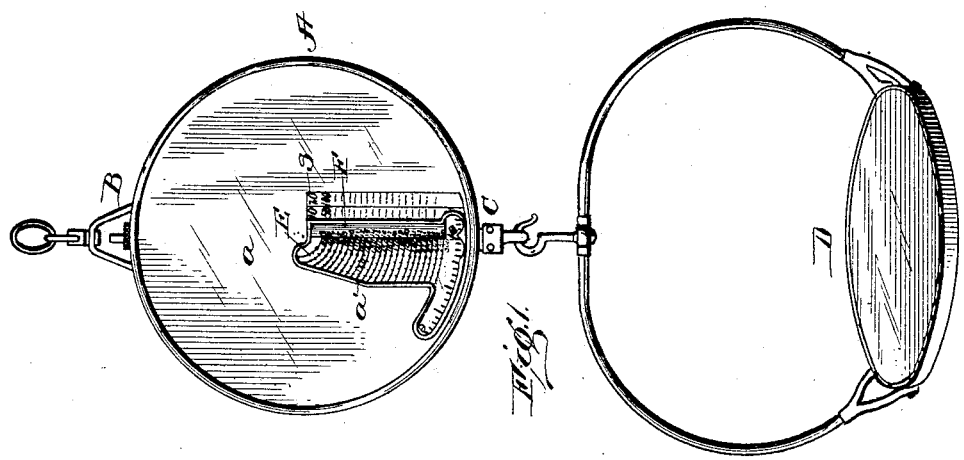
Witnesses:
J. M. Fowler Jr
Alx. J. Stuart
Inventor:
O. O. Ozias
By Church & Church
his Attorneys.

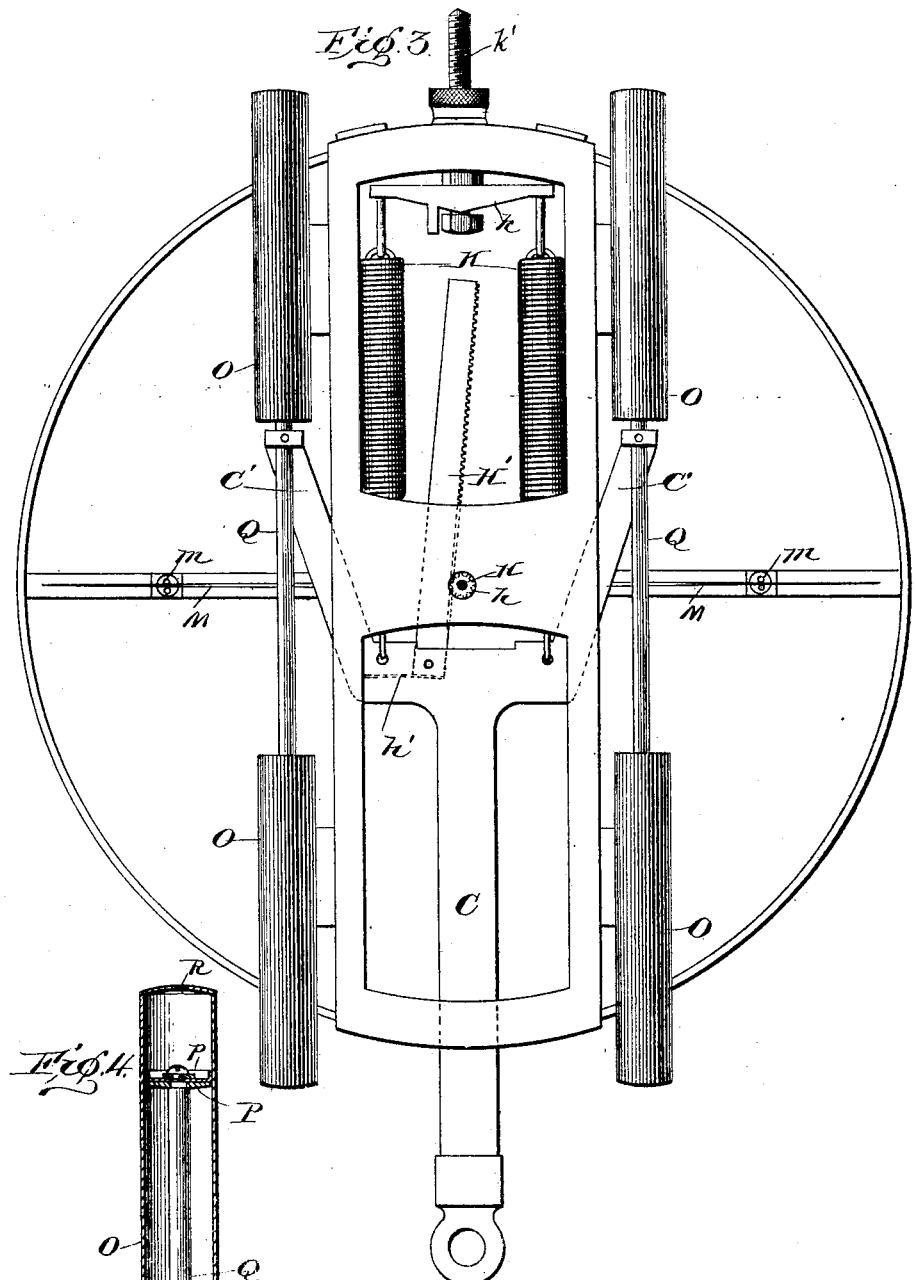

UNITED STATES PATENT OFFICE.

ORANGE O. OZIAS, OF DAYTON, OHIO, ASSIGNOR TO THE COMPUTING SCALE COMPANY, OF DAYTON, OHIO, A CORPORATION OF OHIO.

SPRING-BALANCE SCALE.

SPECIFICATION forming part of Letters Patent No. 708,392, dated September 2, 1902.

Application filed July 26, 1897. Serial No. 646,004. (No model.)

*To all whom it may concern:*

Be it known that I, ORANGE O. OZIAS, of Dayton, in the county of Montgomery and State of Ohio, have invented a certain new and useful Improvement in Spring-Balance Scales; and I do hereby declare the following to be a full, clear, and exact description of the same, reference being had to the accompanying drawings, forming a part of this specification, and to the letters of reference marked thereon.

This invention has for its object to provide a scale of that type known as "spring-balance" scales and embodying a spring-supported goods support or receiver with a rotary indicator connected therewith for indicating the weight and the cost of the goods; and the object of the invention is to provide such a scale with means whereby the danger of disarrangement by reason of shocks imparted by suddenly placing goods on or taking them off the receiver is avoided.

The further object of the invention is to provide a means for enabling cost prices to be determined readily when the weight or value of the goods exceeds the capacity indicated by the rotary indicator in making one revolution.

Referring to the accompanying drawings, Figure 1 is an elevation, partly in perspective, of a scale constructed in accordance with the present invention. Fig. 2 is a similar view looking at the opposite side of the scale. Fig. 3 is an elevation with the casing in section and illustrating the internal mechanism. Fig. 4 is a detail vertical section of one of the speed-governor cylinders and showing the loose connection between the piston and scale mechanism.

Like letters of reference in the several figures indicate the same parts.

In the embodiment of the invention shown the scale resembles very closely in external appearance the ordinary spring-balance scales now on the market, and while I have particularly illustrated the construction of such a scale it will be understood that my invention is applicable to any of the many types of spring-balance scales now known in the art.

The letter A indicates the dial-case, which is preferably cylindrical in form and is adapted to be supported by a hanger B, attached thereto at the top, and to have at the bottom an aperture through which the goods-support C may work and to which goods-support the usual pan D may be attached. As shown in Fig. 1, the face of the casing $a$ is provided with an aperture $a'$, of irregular shape and to be presently described, through which the table of computations on the rotating dial E may be seen and with one edge of which such computations are adapted to register to indicate the cost prices at various rates per unit, which rates are marked on a scale F along the edge of the aperture. The opposite face of the casing, Fig. 2, is preferably graduated to indicate pounds and ounces, and a rotary pointer G registers with the graduations $g'$ to indicate the weight of the article or articles placed on the scale. The dial E and pointer G are preferably both placed on a shaft H, Fig. 3, journaled in the casing and provided with a pinion $h$, dotted lines, Fig. 3, with which the pivoted rack-bar H' meshes. The rack-bar H' is pivoted on the goods-support C and is held in mesh with the pinion by a spring $h'$, dotted lines, Fig. 3. The support C is supported by a spring or springs K, preferably arranged so as to allow said support C to hang in a direct line between the hanger B and the point to which the pan is attached in order that there may be no side draft, and, as is customary in such scales, the upper end of the spring or springs is preferably adjustably connected with the top of the casing by means of a spider $k$ and set-screw $k'$. With such scales practice has demonstrated that if the goods are placed suddenly on the pan or removed suddenly therefrom or a sudden movement in either direction is imparted to the support C the momentum acquired by the dial or pointer, or both these parts, is sufficient to disarrange the working parts of the scale when the support reaches the limits of its movement, and various devices have been suggested and employed to in a measure overcome this defect. For instance, as shown in the drawings, the dial E is connected with the shaft H by spring-arms M, radially mounted on the shaft, with their outer ends passing through bearings $m$, formed on the dial, whereby the dial is allowed a certain degree of independent movement, but is always returned to its proper position relative to the support C, such construction being shown in the patent to Johnson, No. 514,471. The bearings m, through which the ends of the arms pass, are preferably provided with rounded inner faces, so as to prevent undue friction, and said bearings may be swiveled to the dial, as indicated in Fig. 3, in order to accomplish the same ends. With a view now to entirely overcoming this objection I provide in the present instance a governor which will control the speed of movement of the support C in each direction and which governor will not exert the slightest influence tending to prevent the ultimate movement of the support C to the correct point, or, in other words, the governor exerts but slight, if any, influence if the support C is moved slowly in either direction; but it at once checks any rapid movement and causes the parts of the scale to move slowly and deliberately, and thereby prevents the parts from acquiring such momentum as would disarrange them when the motion is arrested. Obviously many forms of double-acting governors would at once suggest themselves to one skilled in the art, and while I do not wish to be limited to any particular form I have illustrated in the drawings a form which I consider eminently practical and efficient. This governor consists of air-cushions for checking the rapid movement of the support C in either direction, with means for allowing the air to escape gradually, and so allowing the support to reach its true and correct position in accordance with the weight suspended therefrom or to reach its true normal position when the weight is removed therefrom, and to still further insure this action I form a loose connection between the governor and support C, inasmuch as the momentum acquired by the support C will when goods are hung thereon carry it beyond its true ultimate position, and the loose connection will permit it to swing or settle at its ultimate position without having any influence whatsoever exerted thereon by the governor.

Referring particularly to Fig. 3, it will be seen that I have arranged four pneumatic cylinders O in the casing, two on each side of the support C, those on each side being in line with each other and adapted to receive pistons P, Fig. 4, to which are connected connecting-rods Q. The connecting-rods Q connect the pistons in the top and bottom cylinders, respectively, for simultaneous movement, and at a point intermediate the cylinders O the connecting-rods are connected with arms C' of the support C, this connection being preferably a loose connection formed by means of a pin c, passing through slots c', as shown clearly in Fig. 4. Obviously the pistons P may be so loosely mounted in the cylinders as not to create any friction whatever tending to retard their free movement; but at the same time by any rapid movement the air will be condensed in the ends of the upper and lower cylinders, depending upon the direction of movement, to a sufficient degree to check gradually the movement of the support C, and at the same time a continued pressure of the goods hanger or support or of the springs K in returning the support to normal position will cause the air to pass out slowly and permit the support C and the indicator connected therewith to move to their proper position to register correctly. In the preferred construction I mount on each of the pistons P a light leather packing p, which will prevent to a certain extent the escape of air around the piston, and in order to permit the air to escape from the ends of the cylinders I form apertures R in such ends, whereby I am enabled to more readily determine the rate at which the air shall escape by varying the size of the aperture in each cylinder and to insure the uniform action of the cylinders.

The dial E, it will be understood, carries tables of computations and graduations which will indicate the cost prices at any of the unit rates marked on the casing within the capacity of the scale when the dial is making one revolution—that is to say, in the form shown, wherein the scale is a ten-pound scale, the dial E will indicate values of goods weighing ten pounds or less at any of the said rates; but if a greater weight than this be placed on the support and dial given more than one rotation or more than two rotations no means have ordinarily been provided for indicating the increased values, except such as were connected with the operating mechanism, and hence impose work on the moving members, and thereby prevent that accuracy which is necessary to the successful operation of the scales. With my present invention I provide on the casing parallel with the table of rate prices tables of computations S, indicating the cost of articles at said rate when the dial has made one and two revolutions, respectively. For instance, assuming that the rate is five cents per pound I arrange to the right of the indication "5" first the figure "50," indicating a cost of ten pounds at five cents per pound, and in the next column I arrange figure "$1," indicating the cost of twenty pounds at five cents per pound. With such a table of computations immediately adjacent the rate indications and knowing that the dial has made more than one or more than two revolutions it is a simple matter to add to the amount indicated by the dial the amount in the proper column. For instance, with the example given if the dial has rotated one and a half times the figure "25" will appear on the dial, and adding this to the "50" indicated in the first column will show at once that the goods are worth seventy-five cents, and so if the dial has made two revolutions and a half we would add the twenty-five cents shown on the dial and the one dollar in the second column.

In operation when goods are placed on the support C without shock or without allowing the weight to be suddenly applied to the support the scale will operate to all appearances just as an ordinary spring-balance scale; but if said goods are dropped on the support or are suddenly jerked therefrom when the support is depressed the support will first move rapidly until the air is compressed in the cylinders, when the compression of such air will arrest the rapid movement, and as the air slowly escapes it will allow the support to settle to its proper position, and in its movement it will carry with it or cause the dial or indicator to move at the proper relative rate to give the proper indication of weight and value.

It will be noted that the governor is, in effect, a differential governor, acting to interpose a differential resistance, allowing the support to move rapidly at first, thereby insuring a quick-action scale, and it will be further noted that the governor is so attached to the goods-support as to prevent any lateral deflection thereof, or, in other words, the governor is attached to opposite sides thereof.

Having thus described my invention, what I claim as new is—

1. In a spring-balance scale, the combination of a vertically-movable runner, a horizontal rotatable spindle, a pinion secured to said spindle, and a rack secured to the runner and engaging with said pinion, with two vertical pneumatic dash-pots, each having its upper end open, which dash-pots are fixed on opposite sides of the runner and below the scale-spindle, plungers in said dash-pots and connecting-rods which are connected at their lower ends to said plungers and at the upper ends with the runner; substantially as described.

2. In a spring-balance scale, the combination with the scale-frame and two vertical dash-pot cylinders which are open at the upper ends, said cylinders being placed on opposite sides of the scale center, with a vertically-movable spring-supported runner, having two arms which extend upward and laterally to points above the open ends of the dash-pots, plungers in the dash-pots and rods connecting said plungers and runner-arms; substantially as and for the purpose specified.

3. In a spring-balance scale, the combination of a spring-suspended draft-bar, having at its lower end means for suspending the load, with two oppositely-located fixed dash-pot cylinders, their pistons, piston-rods pivotally connected with the draft-bar and connected at the ends with the pistons, an indicating mechanism and a connection between the indicating mechanism and draft-bar located intermediate the dash-pot cylinders; substantially as described.

4. In a spring-balance scale, the combination with a spring-suspended draft-bar having at its lower end means for suspending the load, and an indicator operatively connected with and moved by the draft-bar, of a fixed dash-pot cylinder, a piston and a piston-rod connecting said piston and draft-bar, the connection between the piston and draft-bar being sufficiently loose in the direction of the length of the piston-rod to permit the indicator to reach a final state of rest when moved in either direction uninfluenced by the resistance of the piston; substantially as described.

5. In a spring-balance scale, the combination with a rotary indicator, a spring-suspended draft-bar centrally connected with the indicator for rotating the same and having on its lower end means for suspending the load, of fixed dash-pot cylinders located on opposite sides of the connection between the indicator and draft-bar, pistons in said cylinders and piston-rods pivotally and loosely connecting the pistons and draft-bar, the loose connection being in the direction of the length of the piston-rods and being sufficient to permit the indicator to come to a final state of rest when moved in either direction without being influenced by the pistons.

6. In a spring-balance scale, the combination of a draft-bar, a rotatable spindle mounted above the draft-bar, a driving connection between the draft-bar and spindle and an indicator moved by the spindle, of springs for supporting the draft-bar and counterbalancing the load connected with the draft-bar on opposite sides of the driving connection with the spindle, fixed dash-pot cylinders also located on opposite sides of said driving connection, pistons in said cylinders and piston-rods for said pistons pivotally connected with the draft-bar; substantially as described.

7. In a spring-balance scale, the combination of the scale-frame, and two vertical dash-pots supported by said frame on opposite sides of the scale center, plungers in said dash-pots, the vertically-movable runner having laterally-extended arms, and rods connecting said plungers and laterally-extended arms.

8. In a spring-balance scale, the combination of a draft-bar, a rotatable spindle mounted above the draft-bar, a driving connection between the draft-bar and spindle, of springs for supporting the draft-bar and counterbalancing the load connected with the draft-bar on opposite sides of the driving connection with the spindle, fixed dash-pot cylinders also located on opposite sides of said driving connection, pistons in said cylinders and piston-rods for said pistons pivotally connected with the draft-bar.

9. In a spring-balance scale, the combination of a vertically-movable spring-supported runner, a horizontal rotatable spindle, a driving connection between the runner and spindle, two vertical dash-pots secured on opposite sides of the runner, pistons in said dash-pots, and pivotal connections between said pistons and the runner.

ORANGE O. OZIAS.

Witnesses:
C. W. JAMES,
E. CANBY.